Feb. 13, 1968  J. R. WEGH ET AL  3,368,654
VENTILATED DISC BALANCE WEIGHT
Filed Aug. 15, 1966  3 Sheets-Sheet 3
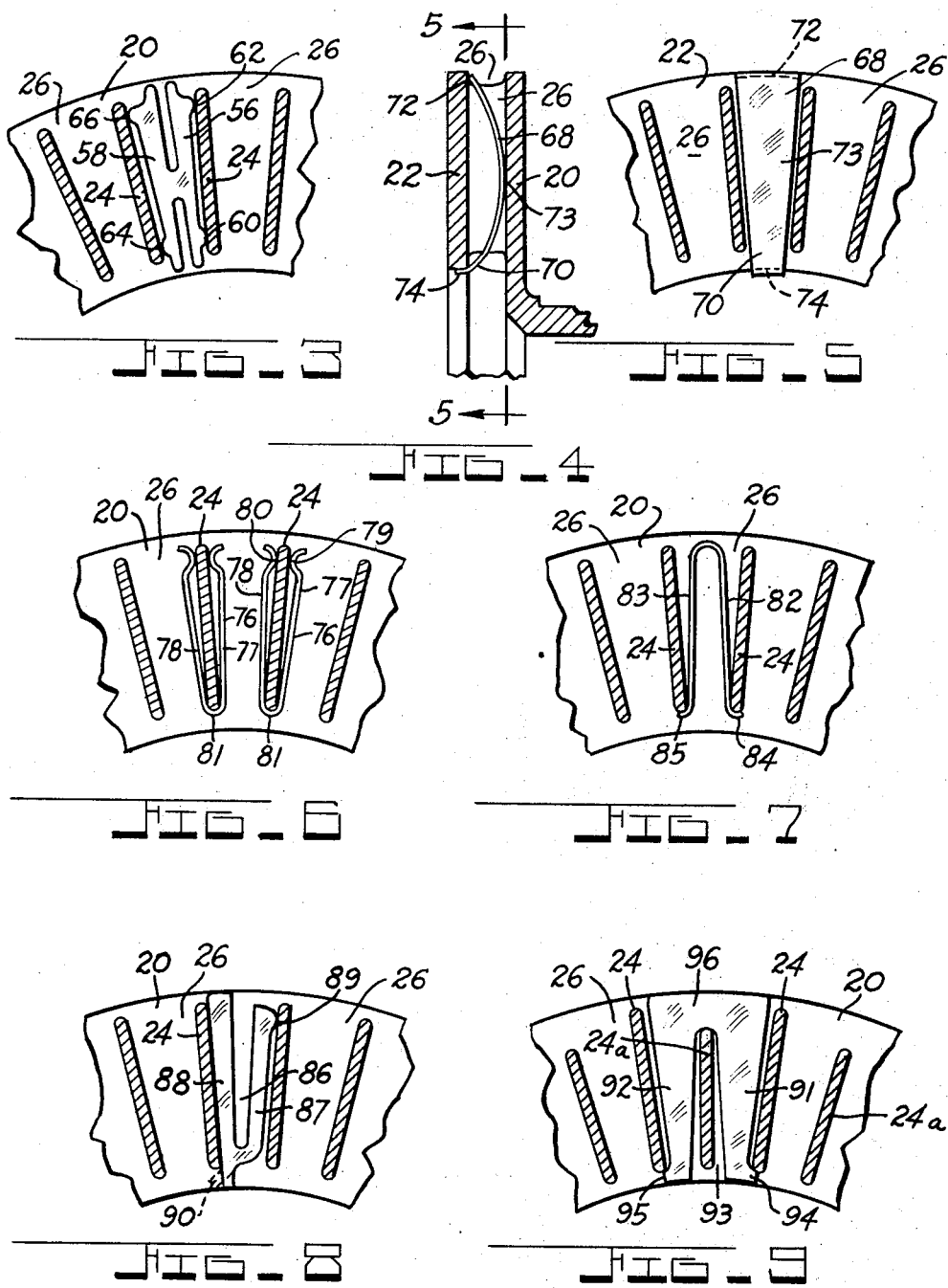
INVENTORS
JOHN R. WEGH.
RICHARD T. BURNETT.
BY- Cecil T. Aeng
ATTORNEY.

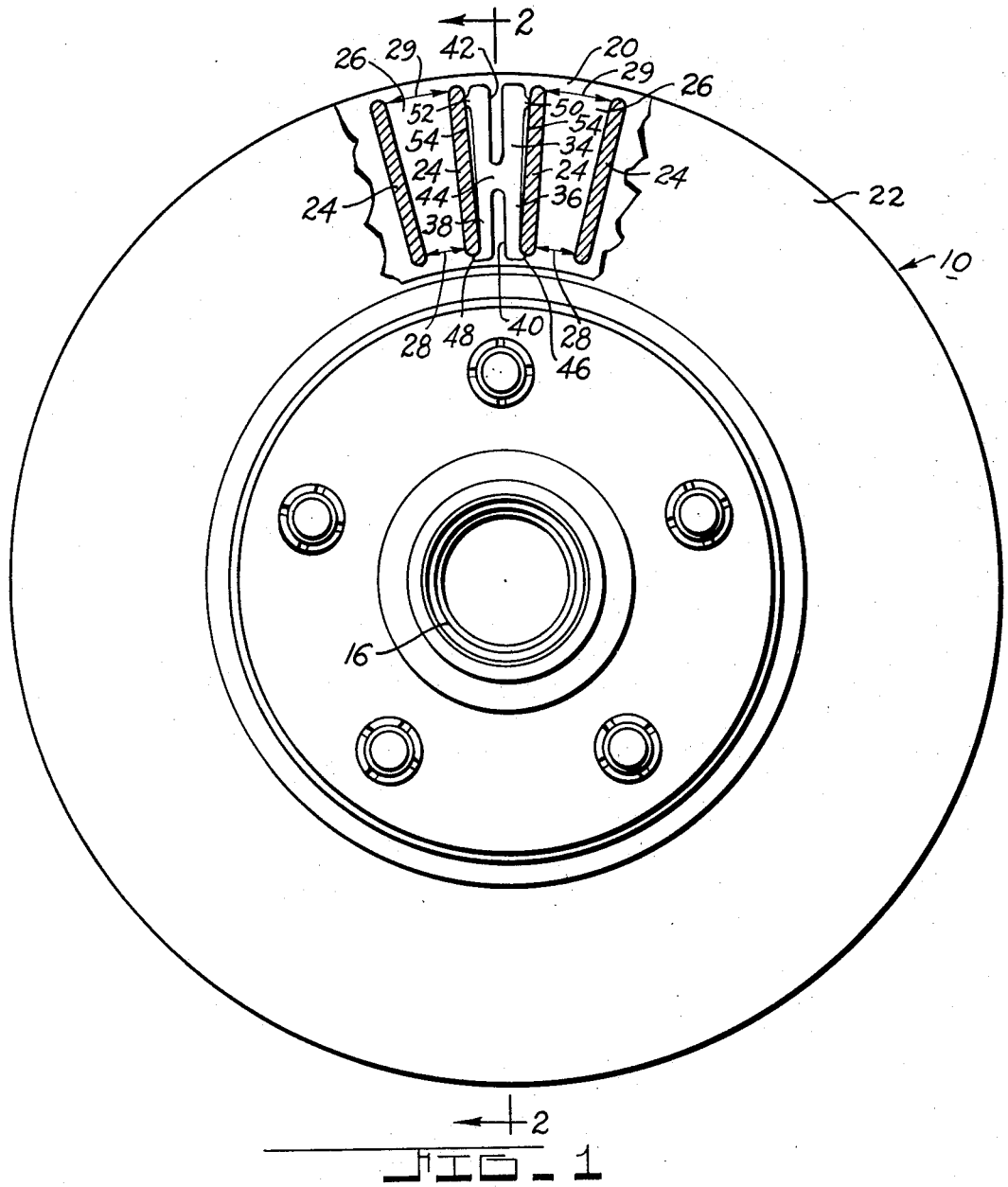

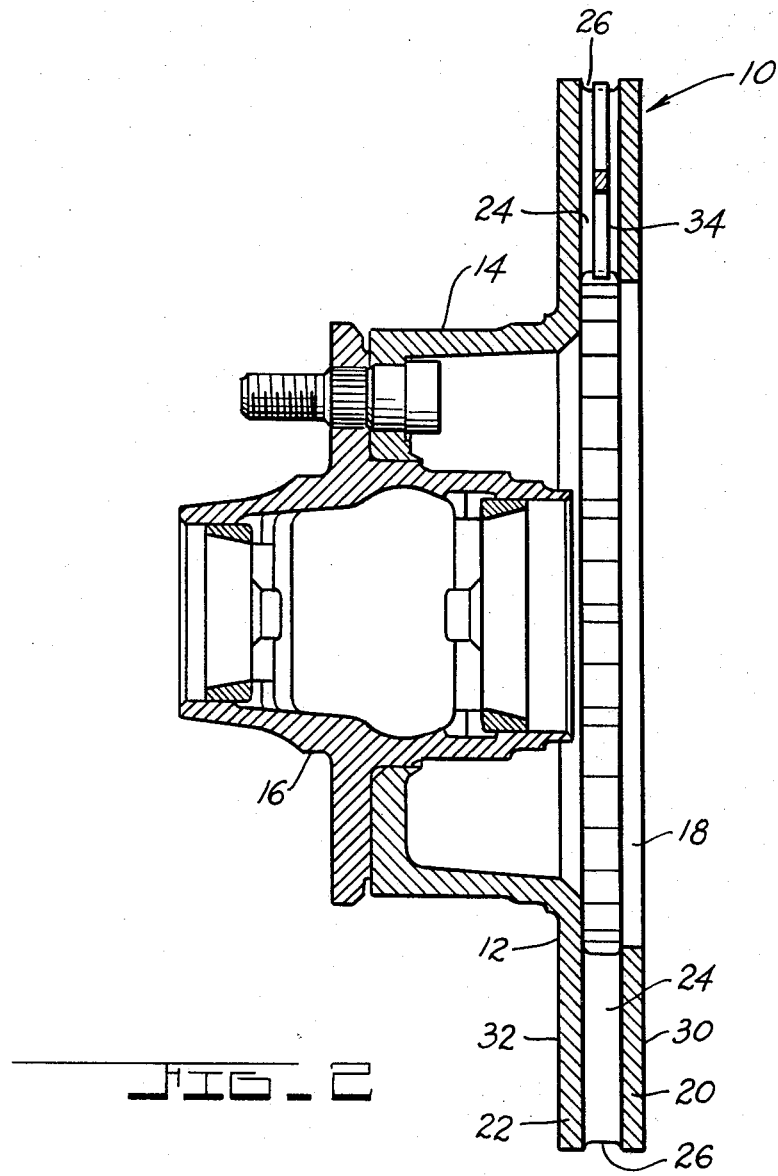

United States Patent Office 3,368,654
Patented Feb. 13, 1968

3,368,554
SELF-CLEANING HAIR WASHER
AND MASSAGER
Shao Hwa Chou, 250 W. 105th St.,
New York, N.Y. 10025
Filed Aug. 19, 1965, Ser. No. 480,932
5 Claims. (Cl. 128—67)

ABSTRACT OF THE DISCLOSURE

A balance weight insertable into the outer end of a radially, inwardly extending and converging passage of a rotatable disc to establish said disc in static or dynamic balance. The balance weight is formed from a generally flat stamping member, having a slot intermediate its yieldable side portions to allow said sides to conform to the wall of said passage to secure said weight in place when said weight is forced into said passage a distance such that the inner end of said weight grips the inner and outer terminal portions of said passage.

In discs of this type there will be certain portions of the rotating mass which may be out of balance, and when such an unbalanced disc is rotated the lack of balance will set up forces causing undesirable vibrations in the disc. Accordingly, it is primary of this invention to provide means for balancing such discs in order to bring the hub and disc assembly into static or dynamic balance so that the forces tending to cause twisting or wobbling will be conteracted or counterbalanced.

Another object is to provide means of this character that can be simply and inexpensively manufactured with all of the parts made up as stampings, and readily assembled with the disc by simple operation requiring little or no special skills.

A further object is to provide a balance weight not requiring bolts or other parts for securing said weight to the disc, but utilizing its own unique construction and design for releasably securing said weight to a disc.

Still another object is to provide a balance weight of this character which employs a simple manufacturing expedient in producing weights varied in size, the variations being accomplished by increasing or decreasing the gauge of metal used in the stamping as well as the dimensions of the stamping.

A still further purpose is to provide a balance weight simple in construction, cheap to manufacture, but yet reliable in operation.

These and many other objects and advantages of the invention will become apparent to those versed in the art from the following specification and claims.

FIGURE 1 is a view in side elevation of one form of ventilated disc with a section of said disc broken away to illustrate the preferred embodiment of the invention;

FIGURE 2 is a radial sectional view of the ventilated disc taken along the lines 2—2 of FIGURE 1;

FIGURE 3 is a fragmentary view of the ventilated disc showing another form of balance weight of the present invention;

FIGURE 4 is a fragmentary radial sectional view through the ventilated disc illustrating a further embodiment of the balance weight of my invention as applied to such a disc;

FIGURE 5 is a sectional view taken on the lines 5—5 of FIGURE 4;

FIGURE 6 is a fragmentary side elevational view of the ventilated disc showing another embodiment of the balance weight of the invention;

FIGURE 7 is a fragmentary side elevational view of the ventilated disc illustrating a yet further embodiment of the balance weight of the invention;

FIGURE 8 is a fragmentary side elevational view of the ventilated disc illustrating still another embodiment of the balance weight of the invention; and FIGURE 9 is a fragmentary side elevational view of the ventilated disc showing another embodiment of the balance weight of this invention adapted to be releasably secured to said disc.

Referring now more particularly to the drawings, FIGURES 1 and 2 illustrate generally the adaptation and utilization of this invention to a ventilated metal disc, which showing can be considered as typically illustrative of a disc structure to which this invention appertains. The rotatable disc 10 is shown here to be of the ventilated type disc, although it shall be understood that the invention is not limited to discs of such a construction. The disc 10 as herein shown has an annular wall structure 12 radially disposed with respect to an axially extending hub member 14 secured to a wheel hub 16 in a manner well known in the automotive field. The disc wall structure 12 is relieved at its central portion 18 in axial relationship to said wheel hub to facilitate assembly. The wall structure 12 is formed of parallel walls 20 and 22 and transverse walls 24 interconnecting said parallel walls to provide generally radial openings or passages 26 into which the balance weight of the invention is inserted.

The passages 26 are formed in the wall structure between the transverse walls 24 in a generally radial direction, with converging openings 28 at the inner terminal portions of said passages. That is, the circumferential distance between the transverse walls, as measured at 29 is greater than the circumferential distance as measured at 28. The parallel walls 20 and 22 are generally machined exteriorly at 30 and 32 respectively to form smooth, uniform braking surfaces for disc brake pads, not shown, but well known in the brake art.

The balance weight 34 shown in FIGURES 1 and 2 is a generally flat rectangularly shaped metal stamping member having side portions 36 and 38 engageable with the transverse walls 24 of the wall structure. The member 34 is provided with oppositely directed inwardly extending slots 40 and 42 terminating in a web section 44. The slots are located generally in the intermediate or middle portion of the member 34 along its length which permits lateral contraction of the sides 36 and 38 when the member is forced into one of the passages 26. It will be noted that slotting the member 34 as aforesaid allows the side portions 36 and 38 to act as resilient portions adapted to flex when inserted into one of the converging openings 26.

These side portions or resilient leg portions 36 and 38 are provided with oppositely extending lateral projections 46 and 48 respectively for engagement with the transverse walls 24 at the inner terminal portion of the opening. To insure engagement between the transverse walls 24 and the upper end of the leg portions 36 and 38, nibs 50 and 52 respectively are formed in the resilient legs or side portions. These nibs, which are radially spaced along the sides of said member, insure positive engagement with the transverse walls at the outer radial end of the passage, notwithstanding irregularities in the wall surfaces 54 of the transverse walls 24 along the radial surface of the walls 24.

The material used for the weight is preferably of a low carbon steel, although obviously this is not absolutely necessary. As the weight is forced through one of the tapered openings 26 between the transverse walls 24 of the wall structure 12 the weight is stressed beyond the elastic limit. As the weight is forced further into the passage or opening, the oppositely extending lateral projections 46 pass beyond the terminal portion of the passage and spring back a small amount into engagement with the terminal portions of the transverse walls 24, thus securely

3,368,654

3 weight into position. The nibs 50 and 52 not only provide additional gripping action for securing the weights in location, but also prevent the weights from rattling. Stressing the metal in the compensating walls beyond the elastic limit provides a means of compensating for irregularities and provides a constant load against the transverse walls while still providing casting tolerances of such dimensions in relationship to the openings in the transverse walls.

The weight is of a shape and dimension that it is to be inserted into the opening toward the axis of the disc it will drop freely into place so that when the weight is inserted into the opening it will then be required to traverse approximately one quarter of its length until it is in position at the periphery of the disc. A force will then be required to properly position the stamping or by using more weights may be inserted in adjacent openings if required by changing the amount of weight to be used may be varied either without sacrificing performance of the ventilated disc. This is so because the weight is suspended between the braking surfaces so that air can pass freely around the weight.

The embodiment previously described in FIGURE 3 is similar to the embodiment shown in connection with FIGURES 1 and 2 but differs therefrom in certain details of construction. In this embodiment side portions 56 and 58 are provided with nibs 60, 62, 64 and 66 respectively, which engage the opposed transverse walls 24 to releasably secure the nibs perform the entire gripping action within one of the openings. In this position within one of the openings. In this event shown in FIGURES 4 and 5 is slightly tapered in the side elevation from those previously described shown in the side elevation. As viewed in FIGURE 5, 35 member 68 is arcuate or bowed when inserted in intermediate parallel

4 provide a balance weight of U-shaped construction. However, in this embodiment overlying lateral projections 82, 83 are equipped with oppositely extending inner terminal portions of 85 for engagement with the inner terminal portions of transverse walls 24 to securely locate the weight in opening 26. The overlying portions or opposed legs 82, 83 are formed so that they normally tend to spread apart in their free unattached position in this embodiment so that when the weight shown in this embodiment is forced into the balance one another until the projections of the walls 24 and 85 extend toward the legs 82 and 83 spread apart, resulting in engagement of the projections 84 and 85 with the walls 24 at which secure the weight in position.

The embodiment shown and illustrated in is similar structurally to certain of the other previously described but differs therefrom in of construction. This embodiment is provided 86 in its middle portion, dividing the balance weight in its length, thereby form a substantial 87 and 88 to thereby form a substantial gripping engagement with a nib or projection wall 24 opposite said one inner radial surface of one of the side 88 is in engagement with the balance weight shown with an inner radial projection minutes beyond the dotted lines on 24 to be bent.

The embodiment to certain of the particularly therefrom said member when forced into said passage, said member having resilient leg portions on each side of said slot engaging a pair of walls.

3. In a rotatable disc according to claim 2 wherein said resilient leg portions are equipped with oppositely extending lateral projections engageable with said transverse walls adjacent their inner and outer ends to insure adequate frictional contact therewith notwithstanding irregularities in the surfaces of said walls.

4. In a rotatable disc according to claim 2 wherein said weight is of a width with respect to the width of said passage as to permit said weight to be inserted by hand from the outer end of said passage a distance of approximately three-fourths of the length of said weight to thereby expedite assembly of said weight with said disc.

5. In a rotatable disc according to claim 3 wherein the leg portions of said weight are provided with oppositely extending lateral projections formed in said leg portions at the outer radial end to engage the interior portions of said transverse walls adjacent their outer terminal end and with additional oppositely extending projections formed in said leg portions at the inner radial end to engage the outer ends of said transverse walls at their terminal point.

References Cited
UNITED STATES PATENTS

| | | | |
|---|---|---|---|
| 2,177,861 | 10/1939 | Burger | 301—5 |
| 2,370,361 | 2/1945 | Le Jeune | 301—5 |
| 2,433,762 | 12/1947 | Kalajian | 74—573 X |
| 3,273,419 | 9/1966 | Kellmann et. al. | 74—573 |
| 3,292,746 | 12/1966 | Robinette | 188—218 |

MILTON BUCHLER, *Primary Examiner.*

G. E. HALVOSA, *Assistant Examiner.*